United States Patent
Kobayashi et al.

(12) 
(10) Patent No.: US 6,887,525 B2
(45) Date of Patent: May 3, 2005

(54) INSULATION MATERIAL FOR USE IN HIGH-FREQUENCY ELECTRONIC PARTS

(75) Inventors: Mitsuaki Kobayashi, Tokyo (JP); Hiroshi Ayukawa, Sagamihara (JP)

(73) Assignee: 3M Innovative Properties Company, Saint Paul, MN (US)

( * ) Notice: Subject to any disclaimer, the term of this patent is extended or adjusted under 35 U.S.C. 154(b) by 274 days.

(21) Appl. No.: 10/312,414

(22) PCT Filed: Jun. 21, 2001

(86) PCT No.: PCT/US01/19993

§ 371 (c)(1),
(2), (4) Date: Dec. 26, 2002

(87) PCT Pub. No.: WO02/03397

PCT Pub. Date: Jan. 10, 2002

(65) Prior Publication Data

US 2004/0063868 A1 Apr. 1, 2004

(30) Foreign Application Priority Data

Jun. 30, 2000 (JP) .................................. 2000-198017
Oct. 24, 2000 (JP) .................................. 2000-324056
Oct. 31, 2000 (JP) .................................. 2000-332812

(51) Int. Cl.$^7$ ........................... C08L 79/08; B05D 3/00
(52) U.S. Cl. ................. 427/385.5; 427/372.2; 428/473.5; 525/180

(58) Field of Search ................ 427/385.5, 372.2; 428/473.5; 525/180

(56) References Cited

U.S. PATENT DOCUMENTS

| 3,693,086 A | | 9/1972 | Redecker et al. |
| 4,302,413 A | | 11/1981 | Howe et al. |
| 4,770,922 A | * | 9/1988 | Hatakeyama et al. ....... 428/211 |
| 5,750,641 A | | 5/1998 | Ezzell et al. |

FOREIGN PATENT DOCUMENTS

| EP | 0 126 781 A1 | 12/1984 |
| EP | 0 301 543 A2 | 2/1989 |
| EP | 0 340 737 A2 | 11/1989 |
| EP | 0 366 307 A2 | 5/1990 |
| JP | 59-202-258 | 11/1984 |
| JP | 60-037-415 | 2/1985 |
| JP | 60-038-464 | 2/1985 |
| JP | 10-101931 | 4/1998 |

* cited by examiner

*Primary Examiner*—Ana Woodward

(57) ABSTRACT

To provide an insulating material that has low dielectric constant and low dielectric loss tangent, and is superior in its processability into thin film. An insulating material for use in high-frequency electronic parts comprising: a matrix component composed at polyimide, and fluorocarbon resin particles uniformly dispersed therein.

6 Claims, 1 Drawing Sheet

INSULATION MATERIAL FOR USE IN HIGH-FREQUENCY ELECTRONIC PARTS

TECHNICAL FIELD OF THE INVENTION

The present invention relates to an insulating material which is superior in electric properties (low-dielectric property) and processability (film-forming property), and more particularly concerns an insulating material suitable for high-frequency electronic parts.

In recent years, along with an increase in the amount of information transmission in the field of the information communication, the application of high-frequency signals in frequency bands exceeding 1 GHz has been developed. As compared with a low-frequency signal, a high frequency signal can increase the amount of information transmitted per unit time in proportion to its frequency, thereby making it possible to provide high speeds in electronic apparatuses and communication apparatuses. Moreover, since the high-frequency signal has a short wavelength, it is possible to miniaturize parts such as antennas, and consequently to miniaturize electronic and electric appliances and make them compact.

However, the high-frequency signal has a disadvantage such as a great signal energy loss (dielectric loss) due to insulators, resulting in a problem in applying and designing the apparatuses.

Conventionally, many kinds of thermoplastic resins have been used as insulating materials for various electronic and electric parts. For example, polyimide has been widely used as insulating materials for electronic parts.

Polyimide is a condensation polymer that is synthesized from difunctional carboxylic acid anhydride and primary diamine. There is an imide structure —CO—NR—CO— in the polyimide as a linear unit and a heterocyclic unit constituting the main chain of the polymer structure.

Polyimide, which has superior mechanical characteristics, and exhibits superior stability with respect to heat and oxidation, are essential from the commercial and industrial point of view. Polyimide products are widely used in place of metal and glass, and the application covers wide ranges including the electric engineering, electronic engineering, cars, airplanes, and packaging industry. Polyimide is available in various forms such as pellets, films, extruded sheets, unprocessed materials and liquids.

U.S. Pat. No. 5,750,641 discloses a polyimide insulating material having a fluorene cores. This type of polyimide not only has a water absorbency of as small as not more than 1%, but also has a glass transition temperature (Tg) of not less than 350□, thereby making it possible to impart resistance to high temperatures to the insulating material.

Moreover, the polyimide is soluble to polar solvents, such as N-methyl pyrrolidone (NMP), γ-butyrolactone and dioxane; therefore, such a solution may be applied to a glass or a silicon substrate so that a polyimide layer having the above-mentioned characteristics is easily formed.

In recent years, in the field of the information communication, multi-chip module (MCM) substrates for use in microwaves and monolithic microwave ICs (MMIC) have been used so as to meet demands for an increase in the amount of information communication. However, the above-mentioned polyimide insulating material, as it is, is not applied to the ICs. This is because its dielectric constant and dielectric loss tangent are too high in the corresponding frequency bands.

For example, the dielectric constant of the polyimide of the above-mentioned patent is not less than 3.0 and the dielectric loss tangent thereof is not less than 0.015 at a frequency of 12.8 GHz. Consequently, when this polyimide is used as an interlayer insulation film, a great dielectric loss is caused, resulting in difficulty in transmitting information effectively. Therefore, fluorocarbon resin which has comparatively low dielectric constant and dielectric loss tangent, is normally used as an insulating material for the above-mentioned ICs. Polytetrafluoroethylene (PTFE) for example has a dielectric constant of 2.05, and a dielectric loss tangent of 0.00047.

However, the fluorocarbon resin has a comparatively high melting point (PTFE has a melting point of 327□). Such a high melting point makes it difficult to form film on a substrate.

Here, Japanese Laid-Open Patent Publication No. 10-101931 discloses a composite resin in which polyphenylene ether is blended in polyimide so that the dielectric characteristic of the polyimide is improved. However, this composite resin is a thermoplastic resin having a processing temperature of as high as 250□ to 300□; therefore, it is difficult to form film on a substrate in the same manner as the fluorocarbon resin.

PROBLEMS TO BE SOLVED BY THE INVENTION

The present invention has been devised to solve the above-mentioned conventional problems, and its objective is to provide an insulating material which has low dielectric constant and dielectric loss tangent and which is superior in processability into thin film.

MEANS FOR SOLVING THE PROBLEMS

The present invention is intended to provide an insulating material for use in high-frequency electronic parts comprising: a matrix component composed of polyimide, and fluorocarbon resin particles uniformly dispersed therein; thus, it is possible to achieve the above-mentioned objective.

The insulating material for use in high-frequency electronic parts of the present invention is preferably manufactured by a method comprising the steps of: preparing a polyimide solution by dissolving soluble polyimide in a volatile organic solvent; preparing a fluorocarbon resin dispersed polyimide solution by adding fluorocarbon resin particles to the polyimide solution so as to be uniformly dispersed; applying the fluorocarbon resin dispersed polyimide solution to a substrate; and drying the resulting product.

EMBODIMENT OF THE INVENTION

With respect to the polyimide adopted in the insulating material for use in high-frequency electronic parts of the present invention, any of those thermoplastic resins that have been normally applied as insulating materials for use in electronic parts may be basically used. However, it is preferable for the polyimide adopted in the insulating material for use in high-frequency electronic parts of the present invention to be soluble to a solvent at a temperature not more than the melting point of the fluorocarbon resin particles, more preferably, at room temperature. With this condition, it becomes possible to easily carry out the process for dispersing the fluorocarbon resin particles in the polyimide and the film-forming process of the resulting polyimide solution with fluorocarbon resin dispersed therein.

Among soluble polyimides, those most preferable are polyimides having structures indicated by formula I in column 4 and formula IV in column 5 disclosed in U.S. Pat. No. 5,750,641. These polyimides having fluorene cores contain a 9,9-bis(aminoaryl) fluorene as a diamine component, and are obtained by subjecting the diamine component and at least one aromatic tetracarboxylic acid dianhydride to condensation polymerization in an organic solvent.

With respect to preferable diamine components for preparing the soluble polyimide, examples thereof include: 9,9-bis(3-methyl-4-aminophenyl)fluorene (OTBAF), 9,9-bis(4-aminophenyl)fluorene (BAF), m-phenylenediamine (m-PD), p-phenylenediamine (PDA), 2,5-dimethyl(p-phenylenediamine)(DMPDA), 9,9-bis((3,5-dimethyl-4-amino)phenyl)n fluorene (DM-OTBAF), 9,9-bis((3-ethyl-5-methyl-4-amino)phenyl)fluorene (DEOTBAF), 9,9-bis(3,5-diethyl-4-aminophenyl)fluorene (BEAF) and 9,9-bis(3-chloro-4-aminophenyl) fluorene.

Moreover, with respect to preferable aromatic tetracarboxylic acid derivatives for preparing the soluble polyimide, examples thereof include: Bisphenol A bis(phthalic anhydride) (BPADA), 4,4'-Oxydi(phthalic anhydride) (ODPA), 2,2'-bis-((3,4-dicarboxyphenyl)-hexafluoropropane dianhydride (6FDA), 3,3'-4,4'-Benzophenone tetracarboxylic acid dianhydride (BTDA), 3,3'-4,4'-biphenyltetracarboxylic dianhydride (s-BPDA) and Pyromellitic dianhydride (PMDA).

With respect to the organic solvents used in the condensation polymerization reaction, those solvents that can dissolve the polyimides to be formed are used. Examples thereof include polar aprotic solvents such as N-methylpyrrolidone, N,N-dimethyl-acetamide and N,N-dimethylformaldehyde.

Particularly preferable polyimide structures suitable for the soluble polyimides are represented as follows (formulae 1 to 3):

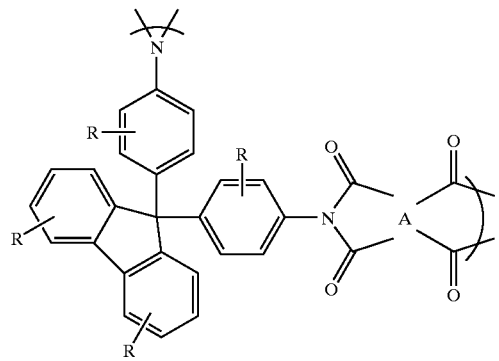

Formula 1 wherein each R independently can be from 0 to 4 substituents selected from the group consisting of hydrogen, halogen, phenyl, phenyl group substituted by 1 to 4 halogen atoms or alkyl groups having 1 to 10 carbon atoms, and an alkyl group having from 1 to 10 carbon atoms; preferably R is selected from halogen, phenyl, phenyl group substituted by 1 to 4 halogen atoms or alkyl groups having 1 to 10 carbon atoms, and an alkyl group having from 1 to 10 carbon atoms as substituents;

A can be a tetrasubstituted aromatic group having from 6 to 20 carbon atoms; preferably A is a (1) pyromellitic group, (2) a polycyclic aromatic group such as naphthylene, fluorenylene, benzofluorenylene, anthracenylene, and substituted derivatives thereof, wherein the substituted groups can be alkyl having 1 to 10 carbon atoms and fluorinated derivatives thereof, and halogen such as F or Cl, and (3) moieties of Formula 2:

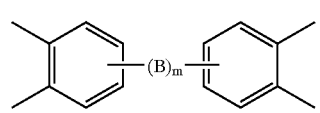

Formula 2 wherein B can be a covalent bond, a $C(R^2)_2$ group, a CO group, an O atom, an S atom, and $SO_2$ group, a $Si(C_2H_5)_2$ group or an $N(R^3)_2$ group, and combinations thereof, wherein m can be an integer of 1 to 10; each $R^2$ independently can be H or $C(R^4)_3$; each $R^3$ independently can be H, an alkyl group having from 1 to about 20 carbon atoms, or an aryl group having from about 6 to about 20 carbon atoms; and each $R^4$ independently can be H, fluorine, or chlorine.

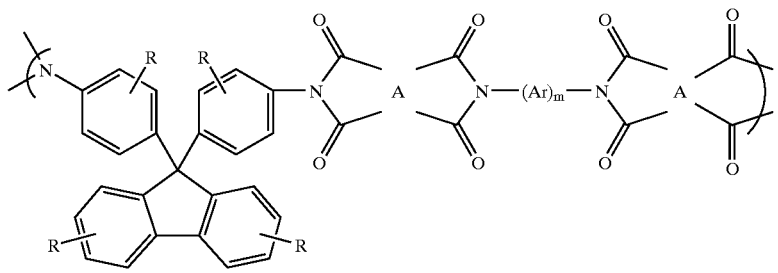

Formula 3 wherein R, A, and m are as described above.

Ar represents a monocyclic or polycyclic aromatic group having from 6 to 20 carbon atoms which can be selected from die group consisting of phenylene, naphthylene, fluorenylene, benzofluorenylene, anthracenylene, and substituted derivatives thereof, wherein the substituted groups can be alkyl having 1 to 10 carbon atoms and fluorinated derivatives thereof, and halogen such as F or Cl; and moieties of Formula 4:

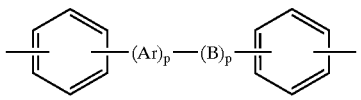

Formula 4 wherein Ar and B can have the meaning described above, and each p independently can be an integer of 0 to 10.

Other preferable examples of soluble polyimides include: "UPILEX-R" and "UPIMOL" made by Ubekosan k.k.; "NITTOMID-M" made by Nitto Denko k.k.; "PI-2080" made by Dow Ltd.; "LARC-TPI" made by Mitsui Toatsu k.k. (present Mitsui Chemical k.k.); "WULTEM" made by GE Ltd., etc.

One kind of polyimide may be used alone, or a plural kinds thereof may be used. Moreover, a resin other than polyimide may be mixed therewith as long as it does not impair the dissolving property and electric characteristics (low dielectric property) to the solvent.

Examples of resins preferably used in combination with the polyimide include: polycarbonate (PC), modified polyphenylene ether (PPE), polyethylene (PE), etc. Each of these resins is generally used from 1 to 50% by weight, preferably from 1 to 20% by weight, in the matrix component containing polyimide. When the amount of the resin other than polyimide exceeds 20% by weight, degradation occurs in the heat resistance of the resulting insulating material.

Fluorocarbon resin particles are employed in the insulating material for use in high-frequency electronic parts of the present invention. The fluorocarbon resin particles have an average particle size of 0.01 to 1000 µm, preferably 0.01 to 10 µm. If the average particle size of the fluorocarbon resin is larger than 1000 µm, dielectric loss and dielectric constant of the resulting insulating material may become poor. Whereas, if it is smaller than 0.01 µm, uniform dispersing may become difficult.

Fluorocarbon resin means the resin in which a hydrogen atom of a hydrocarbon resin such as polyethylene and polypropylene is replaced with a fluorene atom. Examples of the preferred fluorocarbon resin include polytetrafluoroethylene (PTFE), tetrafluoroethylene-perfluorovinyl ether copolymer (PFA), and tetrafluoroethylene-hexafluoropropylene copolymer (FEP).

PTFE is for example available from Du Pont de Nemours & Company as "TEFLON". PFA is for example available from Dyneon LLC as "DYNEON PFA". FEP is for example available from Dyneon LLC as "DYNEON FEP".

With respect to PTFE particles, they are commercially available, for example, as "KD-1000AS", "KD-500AS", "KD-600AD", etc. (brand names) made by Kitamura k.k.

With respect to the fluorocarbon resin particles, those of porous particles are preferably used. These porous particles make it possible to introduce air in the polyimide resin, thereby making it easier to achieve low dielectric constant and low dielectric loss tangent.

Therefore, void content of the fluorocarbon resin particles is set in the range of 10 to 90% by volumme (200 to 2000 g/l in bulk density), preferably 50 to 90% by volume. The void content exceeding 90% by volumme tends to cause a reduction in the mechanical strength (rigidity) of the resulting insulating material, and the value less than 10% by volumme makes it difficult to obtain low dielectric constant and low dielectric loss tangent.

With respect to porous PTFE particles, they are commercially available as "FOSTAFLON TF9201", "FOSTAFLON TF9205", "FOSTAFLON TF9207", etc. (trade names) made by Minnesota Mining and Manufacturing Company.

The fluorocarbon resin particles are uniformly dispersed in soluble polyimide so that the insulating material for use in high-frequency electronic parts of the present invention is obtained. The content of the fluorocarbon resin particles in the polyimide is set in the range of 10 to 95% by weight.

The content of the fluorocarbon resin particles exceeding 95% by weight makes the coating film strength of the insulating material weaker. Moreover, the content of less than 10% by weight fails to obtain desired dielectric characteristics.

The manufacturing method of the insulating material for use in high-frequency electronic parts is not particularly limited; however, for example, the following method is proposed. First, soluble polyimide is dissolved in a volatile organic solvent to prepare a polyimide solution. The concentration of the polyimide solution is properly set so as to allow the fluorocarbon resin particles to be uniformly dispersed therein, and appropriately adjusted so as not to allow the fluorocarbon resin particles to deposit and so as not to require a great amount of energy in the succeeding drying process. The polyimide concentration in the polyimide solution is generally set in the range of 5 to 50% by weight, more preferably 10 to 40% by weight.

With respect to the volatile organic solvent, any of those solvents may be used as long as it dissolves the soluble polyimide at a temperature of not more than the melting point of the fluorocarbon resin particles, more preferably, at room temperature, to exhibit a volatile property. For example, polar organic solvents having a boiling point of 50 to 250□, more preferably 100 to 200□, may be used. Those solvents having nitrogen atoms and oxygen atoms inside the molecule are preferably used; and organic solvents such as those of amine type, ketone type or ether type may be preferably used. Specific examples of the volatile organic solvents include N-methyl pyrrolidone (NMP), γ-butyrolactone, cyclopentanone or dioxane, etc.

A predetermined amount of fluorocarbon resin particles are dispersed in the polyimide solution to provide a fluorocarbon resin dispersed polyimide solution. With respect to the dispersion method, the fluorocarbon resin particles may be directly introduced to the polyimide solution while being stirred, or a dispersion solution, formed by preliminarily dispersing the fluorocarbon resin particles in the volatile organic solvent, may be added to the polyimide solution while being stirred.

The fluorocarbon resin dispersed polyimide solution is applied onto a substrate. This coating process may be carried out by using a normal coating means such as a knife coater or a wire-wound rod.

Next, the coated film is dried. The drying process may be carried out by leaving it at room temperature so as to be dried naturally, or may be forcefully carried out by heating it to a temperature of 50 to 100□. The film thickness after dried is normally set to 1 to 1000 µm, more preferably 5 to 200 µm.

EFFECTS OF THE INVENTION

The resin film thus obtained had a specific dielectric constant of 2.0 to 3.0, more preferably 2.0 to 2.5, and a dielectric loss tangent of 0.0005 to 0.015, more preferably 0.0005 to 0.005, thereby exhibiting preferable electric characteristics, that is, low dielectric constant and low dielectric loss tangent. Therefore, the resin film is particularly suitable for an insulating material for high-frequency electronic parts.

Moreover, in the manufacturing method of an insulating material for use in high-frequency electronic parts of the present invention, simple processes in which a resin solution is applied and dried are used so as to form thin film on a substrate. In other words, it is superior in its processability (film-forming property) because time consuming and complex processes such as beating and melting a resin as well as kneading, extruding and molding the resin can be eliminated.

EXAMPLES

The following description will discuss examples of the present invention in detail; however, the present invention is not intended to be limited thereby. Unless otherwise defined, "parts" in the present examples are defined on the mass basis.

Example 1

Soluble polyimide (20 parts), provided by condensation polymerizing 9,9-bis(3-methyl-4-aminophenyl)fluorene (OTBAF) and bisphenol A-bis (phthalic anhydride) (BPADA), was dissolved in 80 parts of N-methyl pyrrolidone (NMP)(made by Wako Jyunyaku Kogyo k.k.) to obtain a polyimide solution.

A dispersion medium (trade name: KD-1000AS made by Kitamura k.k.) containing 40% by weight of PTFE particles in the NMP was added to the polyimide solution at the rate of polyimide: PTFE (mass ratio)=3:2 to obtain a PTFE dispersed polyimide solution.

The PTFE dispersed polyimide solution was applied to a glass substrate with a knife coater, and this was dried at 100□ for 120 minutes to form a resin film having a dried thickness of 100 μm.

A split post resonator was used to measure the electric characteristics of the resulting resin films at 12.8 giga-hertz. The results are shown in Table 1.

Comparative Example 1

The same processes as Example 1 except that no PTFE particles were used were carried out to form a resin film having a dried thickness of 100 μm. A split post resonator was used to measure the electric characteristics of the resulting resin films at 12.8 giga-hertz. The results are shown in Table 1.

Example 2

Soluble polyimide (20 parts), provided by condensation polymerizing 9,9-bis(3-methyl-4-aminophenyl)fluorene (OTBAF) and 4,4'-oxydi(phthalic anhydride) (ODPA), was dissolved in 80 parts of N-methyl pyrrolidone (NMP)(made by Wako Jyunyaku Kogyo k.k.) to obtain a polyimide solution.

A dispersion medium (trade name: KD-1000AS made by Kitamura k.k.) containing 40% by weight of PTFE particles in the NMP was added to the polyimide solution at the rate of polyimide:PTFE (mass ratio)=1:1 to obtain a PTFE dispersed polyimide solution.

The PTFE dispersed polyimide solution was applied to a glass substrate with a knife coater, and this was dried at 100□ for 120 minutes to form a resin film having a dried thickness of 100 μm.

A split post resonator was used to measure the electric characteristics of the resulting resin films at 12.8 giga-hertz. The results are shown in Table 1.

Example 3

The same processes as Example 2 were carried out except that the amount of addition of the dispersion medium containing 40% by weight of PTFE particles in the NMP was changed to the rate of polyimide:PTFE (mass ratio)= 3:7; thus, a resin film of 100 μm in dried thickness was formed. A split post resonator was used to measure the electric characteristics of the resulting resin films at 12.8 giga-hertz. The results are shown in Table 1.

Comparative Example 2

The same processes as Example 2 except that no PTFE particles were used were carried out to form a resin film having a dried thickness of 100 μm. A split post resonator was used to measure the electric characteristics of the resulting resin films at 12.8 giga-hertz. The results are shown in Table 1.

TABLE 1

| Example No. | Specific dielectric constant | Dielectric loss tangent |
| --- | --- | --- |
| Example 1 | 2.70 | 0.0065 |
| Example 2 | 2.91 | 0.0121 |
| Example 3 | 2.70 | 0.0075 |
| Comparative Example 1 | 3.11 | 0.0183 |
| Comparative Example 2 | 3.09 | 0.0176 |

Example 4

Soluble polyimide (20 parts), provided by condensation polymerizing 9,9-bis(3-methyl-4-aminophenyl)fluorene (OTBAF) and bisphenol A-bis (phthalic anhydride) (BPADA), was dissolved in 80 parts of N-methyl pyrrolidone (NMP) to obtain a polyimide solution.

Porous PTFE particles ("FOSTAIFLON TF9207"(trade names) made by Minnesota Mining and Manufacturing Company, average particle size 0.12 μm, bulk density 280 g/l (14% by volumme in void content) were added to the polyimide solution at an amount so as to set the rate of polyimide:PTFE (mass ratio)=1:1 to obtain a PTFE dispersed polyimide solution.

The PTFE dispersed polyimide solution was applied to a glass substrate with a knife coater, and this was dried at 100□ for 120 minutes to form a resin film having a dried thickness of 100 μm. The cross-section of the resulting film was enlarged by an electron microscope and observed. FIG. 1 is an electron microscope photograph (×1500) of the cross-section of the film.

A split post resonator was used to measure the electric characteristics of the resulting resin films at 10 giga-hertz. The results are shown in Table 2.

Example 5

The same processes as Example 4 were carried out except that the non-porous PTFE particles same as those employed in Example 1 were used instead of the porous PTFE particles to obtain a resin film having a dried thickness of 100 μm. A split post resonator was used to measure the electric characteristics of the resulting resin films at 10 giga-hertz. The results are shown in Table 2.

TABLE 2

| Example No. | Specific dielectric constant | Dielectric loss tangent |
|---|---|---|
| Example 4 | 2.07 | 0.0028 |
| Example 5 | 2.57 | 0.0028 |

With respect to the resin film of the present example containing the PTFE particles, the specific dielectric constant was in the range of 2.0 to 3.0 and the dielectric loss tangent was in the range of 0.0005 to 0.015. In contrast, with respect to the resin film of Comparative Examples containing no PTFE particles, these factors were all located out of the ranges.

Figure 1:
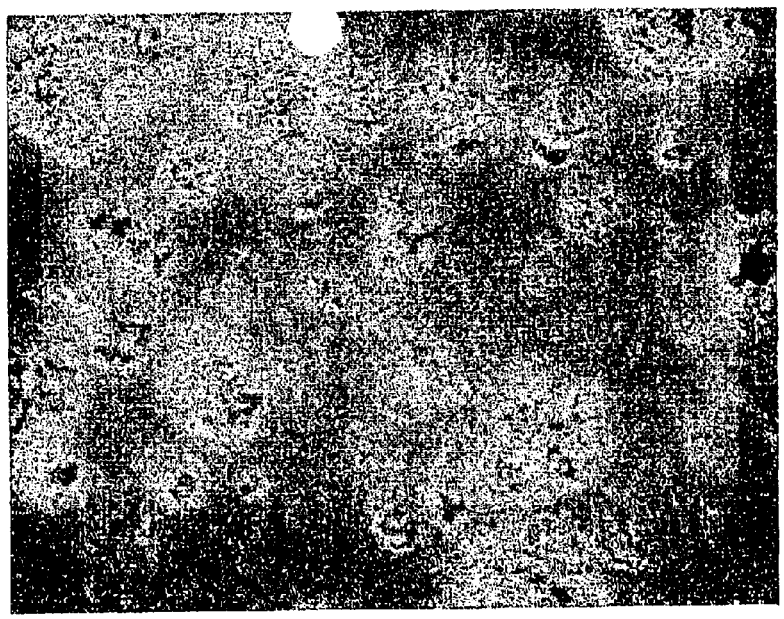
FIG. 1 is an electron microscope photograph (×1500) that shows a cross-section of an insulating material film obtained in Example 4.

What is claimed is:

1. An insulating material for use in high-frequency electronic parts comprising:
    a matrix component composed of polyimide, and fluorocarbon resin particles uniformly dispersed therein, wherein said polyimide comprises a 9,9-bis(aminoaryl) fluorene as a diamine component.

2. The insulating material for use in high-frequency electronic parts according to claim 1, wherein the fluorocarbon resin is selected from the group consisting of polytetrafluoroethylene, tetrafluoroethylene-perfluorovinyl ether copolymer, and tetrafluoroethylene-hexafluoropropylene copolymer.

3. The insulating material for use in high-frequency electronic parts according to claim 1, wherein the fluorocarbon resin particles are contained in an amount of 10 to 95% by weight relative to the total combined weight of fluorocarbon resin particles and polyimide.

4. The insulating material for use in high-frequency electronic parts according to claim 1, wherein the fluorocarbon resin particles have an average particle size of 0.01 to 1000 $\mu$m.

5. The insulating material for use in high-frequency electronic parts according to claim 1, wherein the fluorocarbon resin particles are porous particles.

6. A method of preparing an insulating material for use in high-frequency electronic parts comprising the steps of:
    preparing a polyimide solution by dissolving soluble polyimide in a volatile organic solvent;
    preparing a fluorocarbon resin dispersed polyimide solution by adding fluorocarbon resin particles to the polyimide solution so as to be uniformly dispersed;
    applying the fluorocarbon resin dispersed polyimide solution the a substrate; and
    drying the resulting product.

* * * * *

UNITED STATES PATENT AND TRADEMARK OFFICE
CERTIFICATE OF CORRECTION

PATENT NO. : 6,887,525 B2
DATED : May 3, 2005
INVENTOR(S) : Kobayashi, Mitsuaki

It is certified that error appears in the above-identified patent and that said Letters Patent is hereby corrected as shown below:

Title page,
Item [57], ABSTRACT,
Line 5, delete "at" and insert -- of --.

Column 5,
Line 3, delete "die" and insert -- the --.
Line 22, delete "WULTEM" and insert -- ULTEM --.

Column 7,
Line 13, delete "beating" and insert -- heating --.

Column 8,
Line 43, delete "FOSTAIFLON" and insert -- FOSTAFLON --.

Column 10,
Line 27, delete "the" and insert -- to --.

Signed and Sealed this

Eleventh Day of October, 2005

JON W. DUDAS
*Director of the United States Patent and Trademark Office*